United States Patent
Chatterji et al.

(12) 
(10) Patent No.: US 6,367,549 B1
(45) Date of Patent: Apr. 9, 2002

(54) METHODS AND ULTRA-LOW DENSITY SEALING COMPOSITIONS FOR SEALING PIPE IN WELL BORES

(75) Inventors: Jiten Chatterji, Duncan; Roger S. Cromwell, Walters; Bobby J. King, Duncan; Dennis W. Gray, Comanche; Ronald J. Crook; Frank Zamora, both of Duncan, all of OK (US)

(73) Assignee: Halliburton Energy Services, Inc., Duncan, OK (US)

( * ) Notice: Subject to any disclaimer, the term of this patent is extended or adjusted under 35 U.S.C. 154(b) by 0 days.

(21) Appl. No.: 09/960,768

(22) Filed: Sep. 21, 2001

(51) Int. Cl.⁷ ............................................... E21B 33/14
(52) U.S. Cl. ........................ 166/292; 166/295; 523/130
(58) Field of Search ................................ 166/285, 292, 166/293, 294, 295, 276; 523/130, 131, 132

(56) References Cited

U.S. PATENT DOCUMENTS

| | | | | |
|---|---|---|---|---|
| 4,234,344 A | | 11/1980 | Tinsley et al. | 106/88 |
| 4,461,644 A | | 7/1984 | Childs et al. | 106/76 |
| 4,921,047 A | * | 5/1990 | Summers et al. | 166/276 |
| 4,972,906 A | * | 11/1990 | McDaniel | 166/276 |
| 5,314,023 A | * | 5/1994 | Dartez et al. | 166/295 |
| 5,458,195 A | | 10/1995 | Totten et al. | 166/293 |
| 5,569,324 A | | 10/1996 | Totten et al. | 106/696 |
| 5,621,043 A | | 4/1997 | Croft | 525/111 |
| 5,837,739 A | | 11/1998 | Nowak et al. | 521/54 |
| 5,873,413 A | | 2/1999 | Chatterji et al. | 166/295 |
| 5,875,844 A | | 3/1999 | Chatterji et al. | 166/293 |
| 5,875,845 A | | 3/1999 | Chatterji et al. | 166/293 |
| 5,875,846 A | | 3/1999 | Chatterji et al. | 166/293 |
| 5,911,282 A | | 6/1999 | Onan et al. | 175/72 |
| 5,957,204 A | | 9/1999 | Chatterji et al. | 166/295 |
| 5,969,006 A | | 10/1999 | Onan et al. | 523/166 |
| 6,006,835 A | | 12/1999 | Onan et al. | 166/295 |
| 6,006,836 A | | 12/1999 | Chatterji et al. | 166/295 |
| 6,012,524 A | | 1/2000 | Chatterji et al. | 166/295 |
| 6,068,055 A | | 5/2000 | Chatterji et al. | 166/293 |
| 6,069,117 A | | 5/2000 | Onan et al. | 507/202 |
| 6,070,667 A | * | 6/2000 | Gano | 166/313 |
| 6,098,711 A | | 8/2000 | Chatterji et al. | 166/294 |
| 6,103,784 A | | 8/2000 | Hilborn et al. | 523/219 |
| 6,210,476 B1 | | 4/2001 | Chatterji et al. | 106/677 |
| 6,218,442 B1 | | 4/2001 | Hilborn et al. | 521/85 |
| 6,231,664 B1 | | 5/2001 | Chatterji et al. | 206/724 |
| 6,234,251 B1 | | 5/2001 | Chatterji et al. | 166/295 |
| 6,244,344 B1 | | 6/2001 | Chatterji et al. | 166/295 |
| 6,271,181 B1 | | 8/2001 | Chatterji et al. | 507/219 |
| 6,279,652 B1 | | 8/2001 | Chatterji et al. | 166/194 |

OTHER PUBLICATIONS

3M Speciality Materials For the Oil & Gas Industry brochure dated Jun. 2001.
3M™ Microspheres brochure dated Sep. 2000.
3M Schotchlite™ Glass Bubbles brochure dated Jul. 1999.

* cited by examiner

Primary Examiner—Frank S. Tsay
(74) Attorney, Agent, or Firm—Craig W. Roddy; C. Clark Dougherty, Jr.

(57) ABSTRACT

The present invention provides methods and ultra-low density sealing compositions for sealing pipe in well bores penetrating formations which readily fracture at low hydrostatic pressures. A method of the invention basically comprises the steps of providing a hardenable ultra-low density sealing composition comprised of an epoxide containing liquid, a hardening agent, a hardening accelerating agent, a light weight filler and hollow glass microspheres having a density in the range of from about 5 to 8.5 pounds per gallon, placing the sealing composition in the annulus between the pipe to be sealed and the walls of the well bore and allowing the sealing composition to harden therein.

34 Claims, No Drawings

METHODS AND ULTRA-LOW DENSITY SEALING COMPOSITIONS FOR SEALING PIPE IN WELL BORES

BACKGROUND OF THE INVENTION

1. Field of the Invention

The present invention relates to methods and compositions for sealing pipe strings in well bores, and more particularly, to such methods and compositions wherein the well bores penetrate formations which readily fracture at low hydrostatic pressures.

2. Description of the Prior Art

Sealing compositions are commonly utilized in oil, gas and water well completion and remedial operations. For example, hydraulic cement compositions are used in primary cementing operations whereby strings of pipe such as casing are cemented in well bores. In performing primary cementing, a hydraulic cement composition is pumped into the annular space between the walls of a well bore and the exterior of a string of pipe disposed therein. The cement composition is permitted to set in the annular space thereby forming an annular sheath of hardened substantially impermeable cement therein. The cement sheath physically supports and positions the pipe in the well bore and bonds the pipe to the walls of the well bore whereby the undesirable migration of fluids between zones or formations penetrated by the well bore is prevented.

In some well locations, the subterranean zones or formations into or through which wells are drilled have high permeabilities and low compressive and tensile strengths. As a result, the resistances of the zones or formations to shear are low and they have very low fracture gradients. When a well fluid such as a hydraulic cement composition is introduced into a well bore penetrating such a subterranean zone or formation, the hydrostatic pressure exerted on the walls of the well bore can exceed the fracture gradient of the zone or formation and cause fractures to be formed in the zone or formation into which the cement composition is lost. While light weight cement compositions have been developed and used, i.e., non-foamed cement compositions having densities as low as about 10 pounds per gallon, subterranean zones or formations are still encountered which have fracture gradients too low for even the light weight cement compositions to be utilized without the formation of fractures and the occurrence of lost circulation problems.

Thus, there are needs for improved methods and ultra-low density sealing compositions for sealing pipes such as casings and liners in well bores which penetrate zones or formations having very low fracture gradients.

SUMMARY OF THE INVENTION

The present invention provides methods and ultra-low density sealing compositions for sealing pipe in well bores penetrating zones or formations having low fracture gradients which meet the needs described above and overcome the deficiencies of the prior art. The methods of this invention basically comprise the steps of providing a hardenable ultra-low density sealing composition comprised of an epoxide containing liquid, a hardening agent for hardening the epoxide containing liquid, an optional hardening accelerating agent, an optional organosilane bonding agent, a light weight filler and hollow glass microspheres present in an amount sufficient to produce a sealing composition density in a range of from about 5 to about 8.5 pounds per gallon. The sealing composition is placed into the annulus between a pipe and the walls of the well bore and the sealing composition is then allowed to harden. Upon hardening, the sealing composition eliminates the permeability of the zone or formation, increases its strength and resistance to failure and seals the exterior surface of the pipe to the walls of the well bore.

An ultra-low density sealing composition of this invention is basically comprised of an epoxide containing liquid, a hardening agent for hardening the epoxide containing liquid, an optional hardening accelerating agent, a light weight filler and hollow glass microspheres present in an amount sufficient to produce a sealing composition having an ultra-low density in the range of from about 5 to 8.5 pounds per gallon. The ultra-low density sealing compositions can also include an organosilane bonding agent.

It is, therefore, a general object of the present invention to provide methods and ultra-low density sealing compositions for sealing pipe in well bores.

Other and further objects, features and advantages of the present inventions will be readily apparent to those skilled in the art upon a reading of the description of preferred embodiments which follows.

DESCRIPTION OF PREFERRED EMBODIMENTS

As mentioned, oil, gas and water wells are often drilled into subterranean zones or formations having high permeabilities and low resistances to failure. When conventional well sealing fluids enter such zones or formations by way of the well bores penetrating them, the fracture gradients of the zones or formations can often be exceeded. As a result, fractures are formed in the zones or formations and the sealing fluids are lost therein. In many cases, the fracture gradients of the formations are so low that wells drilled into the formations cannot be completed and must be abandoned. The term "fracture gradient" is used herein to mean the hydraulic pressure per unit of depth required to be exerted on a subterranean formation to cause fractures therein.

By the present invention, methods and ultra-low density sealing compositions are provided for sealing pipes in well bores penetrating zones or formations which readily fracture at low hydrostatic pressures e.g., hydrostatic pressures as low as 10 pounds per gallon. The methods of this invention for sealing a pipe in a well bore penetrating a zone or formation which readily fractures at low hydrostatic pressures is basically comprised of providing a hardenable ultra-low density sealing composition comprising an epoxide containing liquid, a hardening agent for hardening the epoxide containing liquid, an optional hardening accelerating agent, a light weight filler and hollow glass microspheres present in an amount sufficient to produce a sealing composition density in the range of from about 5 to about 8.5 pounds per gallon. The sealing composition is placed into the annulus between the exterior surfaces of the pipe and the walls of the well bore and the sealing composition is allowed to harden therein. As mentioned above, the sealing compositions of this invention can optionally include an organosilane bonding agent to increase the ability of the sealing composition to provide a strong bond to the pipe and to the walls of the well bore.

A variety of hardenable epoxide containing liquids can be utilized in accordance with this invention. Examples of preferred such hardenable epoxide containing liquids include, but are not limited to the diglycidyl ether of 1,4-butanediol, the diglycidyl ether of neopentyl glycol, the diglycidyl ether of cyclohexanedimethanol and mixtures thereof. Of these, the diglycidyl ether of cyclohexanedimethanol is the most preferred.

A suitable epoxide containing liquid comprised of the diglycidyl ether of 1,4-butanediol is commercially available from the Shell Chemical Company under the trade name "HELOXY®67". This epoxide containing liquid has a viscosity at 25° C. in the range of from about 13 to about 18 centipoises, a molecular weight of 202 and a 1-gram equivalent of epoxide per about 120 to about 130 grams of the liquid. A suitable diglycidyl ether of neopentyl glycol is commercially available from Shell Chemical Company under the trade name "HELOXY®68". This epoxide containing liquid has a viscosity at 25° C. in the range of from about 13 to about 18 centipoises, a molecular weight of 216 and a 1-gram equivalent of epoxide per about 130 to about 140 grams of the liquid. A suitable diglycidyl ether of cyclohexanedimethanol is commercially available from Shell Chemical Company under the trade name "HELOXY®107". This epoxide containing liquid has a viscosity at 25° C. in the range of from about 55 to about 75 centipoises, a molecular weight of 256 and a 1-gram equivalent of epoxide per about 155 to about 165 grams of the liquid.

A variety of hardening agents can also be utilized in the sealing compositions of this invention containing the above described epoxide containing liquids including, but not limited to, aliphatic amines, amide amines, amido amines, imidazoles, aliphatic tertiary amines, aromatic amines, cycloaliphatic amines, heterocyclic amines, polyamides, polyethylamines and carboxylic acid anhydrides. Of these, aliphatic amines, aromatic amines and carboxylic acid anhydrides are the most suitable.

Examples of aliphatic and aromatic amine hardening agents are triethylenetetraamine, ethylenediamine, N-cocoalkyltrimethylenediamine, isophoronediamine, diethyltoluenediamine and tris(dimethylaminomethylphenol). Examples of suitable carboxylic acid anhydrides are methyltetrahydrophthalic anhydride, hexahydrophthalic anhydride, maleic anhydride, polyazelaic polyanhydride, phthalic anhydride and mixtures of two or more of such hardening agents. Of these, triethylenetetraamine, ethylenediamine, N-cocoalkyltrimethylenediamine, isophoronediamine, diethyltoluenediamine and tris(dimethylaminomethylphenol) are preferred, with tris(dimethylaminomethylphenol) being the most preferred. The hardening agent or mixture of hardening agents utilized are included in the compositions of this invention in an amount in the range of from about 15% to about 40% by weight of the epoxide containing liquid in the composition.

Various hardening accelerating agents can be utilized including, but not limited to, triethanolamine, benzylalcohol, nonylphenol and tris(dimethyl aminoethanol) phenol. Of these, tris(dimethyl aminoethanol)phenol is preferred. The hardening accelerating agent is included in the sealing composition of this invention in an amount in the range of from about 0% to about 10% by weight of the epoxide containing liquid therein.

Various lightweight fillers can also be utilized including, but not limited to, diatomaceous earth, fumed silica and amorphous silica. Of these, amorphous silica is preferred. A suitable amorphous silica filler is commercially available from Halliburton Energy Services, Inc. of Duncan, Okla. under the trade name "SILICALITE™". The lightweight filler used is included in the sealing composition in an amount in the range of from about 2.5% to about 30% by weight of the epoxide containing liquid in the composition.

The hollow glass microspheres are preferably synthetic hollow glass microspheres, which are commercially available from Minnesota, Mining and Manufacturing Co. (3M™) under the trade name "SCOTCHLITE™". These very low density microspheres are formed of a chemically stable soda-lime borosilicate glass composition which is non-porous and does not absorb epoxide containing liquid. The hollow glass microspheres are included in a sealing composition of this invention in an amount sufficient to produce a sealing composition density in the range of from about 5 to about 8.5 pounds per gallon, i.e., in an amount of about 15% to about 45% by weight of the epoxide containing liquid in the sealing composition.

As mentioned, the ultra-low density sealing composition can also include an organosilane bonding agent. The organosilane bonding agent is preferably 3-aminopropyltrimethoxysilane or N-2-(aminoethyl)-3-aminopropyltrimethoxysilane, which are commercially available from Witco Corporation under the tradenames A-1102 and A-1120, respectively. When used, the orgonaosilane bonding agent is preferably included in the sealing composition in an amount in the range of from about 0% to about 5% by weight of the epoxide containing liquid in the sealing composition, more preferably about 1%.

A preferred method of this invention for sealing pipe in a well bore penetrating a zone or formation which readily fractures at low hydrostatic pressure is comprised of the steps of:

(a) providing a hardenable ultra-low density sealing composition comprised of an epoxide containing liquid, a hardening agent for hardening the epoxide containing liquid, an optional hardening accelerating agent, a light weight filler and hollow glass microspheres present in an amount sufficient to produce a sealing composition density in the range of from about 5 to about 8.5 pounds per gallon;

(b) placing said sealing composition into the annulus between said pipe and the walls of said well bore; and (c) allowing said sealing composition to harden.

A more preferred method of the present invention for sealing pipe in a well bore penetrating a zone or formation which readily fractures at low hydrostatic pressure is comprised of the steps of:

(a) providing a hardenable ultra-low density sealing composition comprised of the diglycidyl ether of cyclohexanedimethanol, a hardening agent comprised of tris(dimethylaminomethylphenol), a hardening accelerating agent comprised of tris(dimethylaminoethanol)phenol, a light weight filler comprised of amorphous silica an organosilane bonding agent comprised of 3-aminopropyltriethoxysilane or N-2-(aminoethyl)-3-aminopropyltrimethoxysilane and synthetic hollow glass microspheres present in an amount sufficient to produce a sealing composition density in the range of from about 5 to about 8.5 pounds per gallon;

(b) placing said sealing composition into the annulus between said pipe and the walls of said well bore; and (c) allowing said sealing composition to harden.

A preferred ultra-low density sealing composition of this invention for sealing pipe in a well bore penetrating a zone or formation, which readily fractures at low hydrostatic pressure is comprised of:

(a) an epoxide containing liquid;

(b) a hardening agent for hardening the epoxide containing liquid present in the sealing composition in an effective amount;

(c) an optional hardening accelerating agent present in the sealing composition in an effective amount;

(d) a light weight filler present in the sealing composition in an effective amount; and (e) hollow glass microspheres present in the sealing composition in an amount sufficient to produce a sealing composition density in the range of from about 5 to about 8.5 pounds per gallon.

A more preferred ultra-low density sealing composition for sealing pipe in a well bores penetrating a zone or formation which readily fractures at low hydrostatic pressures is comprised of:

(a) an epoxide containing liquid comprised of the diglycidyl ether of cyclohexanedimethanol;

(b) a hardening agent comprised of diethyltoluenediamine present in the sealing composition in an amount in the range of from about 15% to about 40% by weight of the epoxide containing liquid therein;

(c) a hardening accelerating agent comprised of tris (dimethylaminoethanol) phenol present in the sealing composition in an amount in the range of from about 0% to about 10% by weight of the epoxide containing liquid therein;

(d) a light-weight filler comprised of amorphous silica present in the sealing composition in an amount in the range of from about 2.5% to about 30% by weight of the epoxide containing liquid therein;

(e) an organosilane bonding agent comprised of 3-aminopropyltriethoxysilane or N-2-(aminoethyl)-3-aminopropyltrimethoxysilane present in the sealing composition in an amount in the range of from about 0% to about 5% by weight of epoxide containing liquid therein; and (f) synthetic hollow glass microspheres present in an amount sufficient to produce a sealing composition density in a range of from about 5 to about 8.5 pounds per gallon.

In order to further illustrate the methods and compositions of this invention, the following examples are given.

EXAMPLE 1

Six test sealing compositions of the present invention were prepared having densities of 5.0 pounds per gallon, 5.5 pounds per gallon, 6.0 pounds per gallon, 6.5 pounds per gallon, 7.5 pounds per gallon and 8.5 pounds per gallon, respectively. The components in the test sealing compositions and their amounts are given in Table I below.

TABLE I

TEST SEALING COMPOSITIONS AT 90° F.

| | Amounts, parts by weight | | | | | |
|---|---|---|---|---|---|---|
| Test Compositions No: | 1 | 2 | 3 | 4 | 5 | 6 |
| Density, lb/gal | 5.0 | 5.5 | 6.0 | 6.5 | 7.5 | 8.5 |
| diglycidyl ether of neopentyl glycol[1] | 100 | 100 | — | — | — | — |
| diglycidyl ether of cyclohexanedimethanol[1] | — | — | 100 | 100 | 100 | 100 |
| diethyltoluenediamine[2] | 33 | 33 | 28 | 28 | 28 | 28 |

TABLE I-continued

TEST SEALING COMPOSITIONS AT 90° F.

| | Amounts, parts by weight | | | | | |
|---|---|---|---|---|---|---|
| Test Compositions No: | 1 | 2 | 3 | 4 | 5 | 6 |
| Density, lb/gal | 5.0 | 5.5 | 6.0 | 6.5 | 7.5 | 8.5 |
| tris (dimethylamino-ethanol) phenol[3] | 5 | 5 | 5 | 5 | 5 | 5 |
| amorphous silica[4] | 15 | 25 | 10 | 10 | 25 | 25 |
| microspheres[5] | 22 | 20 | — | — | — | — |
| microspheres[6] | — | — | 40 | — | — | — |
| microspheres[7] | — | — | — | 40 | 20 | — |
| microspheres[8] | — | — | — | — | 20 | 30 |

[1]epoxide containing liquid
[2]hardening agent
[3]hardening accelerator
[4]Halliburton "SILICALITE ™"
[5]3M ™ "SCOTCHLITE ™ S 15" having a true density of 0.15 g/cc.
[6]3M ™ "SCOTCHLITE ™ S 32" having a true density of 0.32 g/cc.
[7]3M ™ "SCOTCHLITE ™ S 38" having a true density of 0.38 g/cc.
[8]3M ™ "SCOTCHLITE ™ S 60" having a true density of 0.60 g/cc.

EXAMPLE 2

Each of the test sealing compositions were tested for thickening times at 90° F., fluid loss at 90° F. and 48 hour compressive strength at 120° F. in accordance with the procedures set forth in the API SPECIFICATION FOR MATERIALS AND TESTING FOR WELL CEMENTS, API specification 10, 5$^{th}$ ed., dated Jul. 1, 1990 of the American Petroleum Institute. The results of these tests are set forth in Table II below.

TABLE II

TEST RESULTS

| Test Composition No. | Density, lb/gal. | Thickening Time at 90° F., hr.:min. | Fluid loss at 90° F., cc/30 min. | 48 Hour Compressive Strength at 120° F., psi. |
|---|---|---|---|---|
| 1 | 5.0 | 6:32 | 439 | 2580 |
| 2 | 5.5 | 6:32 | 230 | 1000 |
| 3 | 6.0 | 5:33 | 415 | 3830 |
| 4 | 6.5 | 5:15 | 353 | 2080 |
| 5 | 7.5 | 4:15 | 281 | 3130 |
| 6 | 8.5 | 5:11 | 90 | 2430 |

From Table II, it can be seen that the test sealing compositions had thickening times under pressure of from 4 to 6 hours giving adequate time for placement of the compositions, had acceptable fluid loss control and provided exceptionally high 24 hour compressive strengths at 120° F.

EXAMPLE 3

Additional test sealing compositions of the present invention were prepared having densities from 5.0 to 8.5 at 150° F. The test sealing composition components and amounts are set forth in Table III below.

TABLE III

TEST SEALING COMPOSITIONS AT 150° F.

Amounts, parts by weight

| Test Compositions No: | 1 | 2 | 3 | 4 | 5 | 6 |
|---|---|---|---|---|---|---|
| Density, lb/gal | 5.0 | 5.5 | 6.0 | 6.5 | 7.5 | 8.5 |
| diglycidyl ether of neopentyl glycol[1] | 100 | 100 | — | — | — | — |
| diglycidyl ether of cyclohexanedimethanol[1] | — | — | 100 | 100 | 100 | 100 |
| diethyltoluenediamine[2] | 33 | 33 | 28 | 28 | 28 | 28 |
| tris (dimethylamino-ethanol) phenol[3] | 2.5 | 2.5 | 2.5 | 2.5 | 2 | 1.5 |
| amorphous silica[4] | 15 | 25 | 12.5 | 10 | 25 | 25 |
| microspheres[5] | 22 | 20 | — | — | — | — |
| microspheres[6] | — | — | 41 | — | — | — |
| microspheres[7] | — | — | — | 40 | 20 | — |
| microspheres[8] | — | — | — | — | 20 | 30 |

[1] epoxide containing liquid
[2] hardening agent
[3] hardening accelerator
[4] Halliburton "SILICALITE ™"
[5] 3M ™ "SCOTCHLITE ™ S 15" having a true density of 0.15 g/cc.
[6] 3M ™ "SCOTCHLITE ™ S 32" having a true density of 0.32 g/cc.
[7] 3M ™ "SCOTCHLITE ™ S 38" having a true density of 0.38 g/cc.
[8] 3M ™ "SCOTCHLITE ™ S 60" having a true density of 0.60 g/cc.

EXAMPLE 4

The various test compositions given in Table III above were tested for thickening time at 150° F., fluid loss at 150° F. and 24 and 48 hour compressive strength at 200° F. These test results are set forth in Table IV.

TABLE IV

TEST RESULTS

| Test Composition No. | Density, lb/gal. | Thickening Time at 150° F., hr.:min. | Fluid loss at 150° F., cc/30 min. | Compressive Strengths at 200° F., psi. |
|---|---|---|---|---|
| 1 | 5.0 | 4:49 | 333 | 24 Hrs-1023 |
| 2 | 5.5 | 4:40 | 333 | 24 Hrs-3490 |
|   |     |      |     | 48 Hrs-4120 |
| 3 | 6.0 | 4:52 | 333 | 24 Hrs-3080 |
|   |     |      |     | 48 Hrs-5310 |
| 4 | 6.5 | 4:15 | 333 | 24 Hrs-5970 |
|   |     |      |     | 48 Hrs-8170 |
| 5 | 7.5 | 5:25 | 333 | 24 Hrs-5510 |
|   |     |      |     | 48 Hrs-7390 |
| 6 | 8.5 | 6:33 | 491 | 24 Hrs-3880 |
|   |     |      |     | 48 Hrs-10230 |

From the test results given in Table IV, it can be seen that the various sealing compositions have thickening times at 150° F. which give adequate time for placement of the compositions, have acceptable fluid loss control at 150° F. and have exceptionally high 24 hour and 48 hour compressive strengths at 200° F. Also, from Tables I through IV above, it can be seen that changing the amounts of activator and accelerator in the sealing compositions allows the thickening times of the compositions to be adjusted to suit well conditions.

Thus, the present invention is well adapted to carry out the objects and obtain the ends and advantages mentioned. While numerous changes may be made by those skilled in the art, such changes are encompassed within the spirit of this inventions as defined by the appended claims.

What is claimed is:

1. A method of sealing pipe in a well bore penetrating a zone or formation which readily fractures at low hydrostatic pressures comprising the steps of:
   (a) providing a hardenable ultra-low density sealing composition comprised of an epoxide containing liquid, a hardening agent for hardening said epoxide containing liquid, a light weight filler and hollow glass microspheres present in an amount sufficient to produce a sealing composition density in the range of from about 5 to about 8.5 pounds per gallon;
   (b) placing said sealing composition into the annulus between said pipe and the walls of said well bore; and
   (c) allowing said sealing composition to harden.

2. The method of claim 1 wherein said epoxide containing liquid in said sealing composition is selected from the group consisting of the diglycidyl ether of 1,4-bytanediol, the diglycidyl ether of neopentyl glycol, the diglycidyl ether of cyclohexanedimethanol and mixtures of such liquids.

3. The method of claim 1 wherein said epoxide containing liquid in said sealing composition is the diglycidyl ether of cyclohexanedimethanol.

4. The method of claim 1 wherein said hardening agent in said sealing composition is selected from the group consisting of triethylenetetraamine, ethylenediamine, N-cocoalkyltrimethylenediamine, isophoronediamine, diethyltoluenediamine and tris (dimethylaminomethylphenol).

5. The method of claim 1 wherein said hardening agent in said sealing composition is diethyltoluenediamine.

6. The method of claim 1 wherein said hardening agent is present in said sealing composition in an amount in the range of from about 15% to about 40% by weight of said epoxide containing liquid therein.

7. The method of claim 1 which further comprises a hardening accelerating agent in said sealing composition selected from the group consisting of triethanolamine, benzylalcohol, nonylphenol and tris(dimethylaminoethanol) phenol.

8. The method of claim 7 wherein said hardening accelerating agent in said sealing composition is tris (dimethylaminoethanol)phenol.

9. The method of claim 7 wherein said hardening accelerating agent is present in said sealing composition in an amount in the range of from 0% to about 10% by weight of said epoxide containing liquid therein.

10. The method of claim 1 wherein said lightweight filler in said sealing composition is selected from the group consisting of diatomaceous earth, fumed silica and amorphous silica.

11. The method of claim 1 wherein said lightweight filler in said sealing composition is amorphous silica.

12. The method of claim 1 wherein said lightweight filler is present in said sealing composition in an amount in the range of from about 2.5% to about 30% by weight of said epoxide containing liquid therein.

13. The method of claim 1 wherein said hollow glass microspheres are present in said composition in an amount in the range of from about 15% to about 45% by weight of said epoxide containing liquid therein.

14. The method of claim 1 which further comprises an organosilane bonding agent selected from the group consisting of 3-aminopropyltriethoxysilane and N-2-(aminoethyl)-3-aminopropyltrimethoxysilane.

15. The method of claim 14 wherein said organosilane bonding agent is present in said sealing composition in an amount in the range of from abut 0% to about 5% by weight of epoxide containing liquid therein.

16. An ultra-low density sealing composition for sealing pipe in a well bore penetrating a zone or formation which readily fractures at low hydrostatic pressure comprising:

(a) an epoxide containing liquid;

(b) a hardening agent for hardening said epoxide containing liquid present in said sealing composition in an effective amount;

(c) a light weight filler present in said sealing composition in an effective amount; and (d) hollow glass microspheres present in said sealing composition in an amount sufficient to produce a sealing composition density in the range of from about 5 to about 8.5 pounds per gallon.

17. The sealing composition of claim 16 wherein said epoxide containing liquid is selected from the group consisting of the diglycidyl ether of 1,4-butanediol, the diglycidyl ether of neopentyl glycol, the diglycidyl ether of cyclohexanedimethanol and mixtures of such liquids.

18. The sealing composition of claim 16 wherein said epoxide containing liquid is the diglycidyl ether of cyclohexanedimethanol.

19. The sealing composition of claim 16 wherein said hardening agent in said sealing composition is selected from the group consisting of triethylenetetraamine, ethylenediamine, N-cocoalkyltrimethylenediamine, isophoronediamine, diethyltoluenediamine and tris(dimethylaminomethylphenol).

20. The sealing composition of claim 16 wherein said hardening agent is diethyltoluendiamine.

21. The sealing composition of claim 16 wherein said hardening agent is present in said sealing composition in an amount in the range of from about 15% to about 40% by weight of said epoxide containing liquid therein.

22. The sealing composition of claim 16 which further comprises a hardening accelerating agent in said sealing composition selected from the group consisting of triethanolamine, benzylalcohol, nonylphenol and tris(dimethylaminoethanol)phenol.

23. The sealing composition of claim 22 wherein said hardening accelerating agent is tris(dimethylaminoethanol)phenol.

24. The sealing composition of claim 22 wherein said hardening accelerating agent is present in said sealing composition in an amount in the range of from 0% to about 10% by weight of said epoxide containing liquid therein.

25. The sealing composition of claim 16 wherein said lightweight filler in said sealing composition is selected from the group consisting of diatomaceous earth, fumed silica and amorphous silica.

26. The sealing composition of claim 16 wherein said lightweight filler is amorphous silica.

27. The sealing composition of claim 16 wherein said light weight filler is present in said sealing composition in an amount in the range of from about 2.5% to about 30% by weight of said epoxide containing liquid therein.

28. The sealing composition of claim 16 which further comprises an organosilane bonding agent selected from the group consisting of 3-aminopropyltriethoxysilane and N-2-(aminoethyl)-3-aminopropyltrimethoxysilane.

29. The sealing composition of claim 28 wherein said organosilane bonding agent is present in said sealing composition in an amount in the range of from about 0.1% to about 5% by weight of epoxide containing liquid therein.

30. The sealing composition of claim 16 wherein said hollow glass microspheres are present in said composition in an amount in the range of from about 15% to about 45% by weight of said epoxide containing liquid therein.

31. An ultra-low density sealing composition for sealing pipe in a well bore penetrating a zone or formation which readily fractures at low hydrostatic pressure comprising:

(a) an epoxide containing liquid comprised of the diglycidyl ether of cyclohexanedimethanol;

(b) a hardening agent comprised of diethyltoluenediamine present in said sealing composition in an amount in the range of from about 15% to about 40% by weight of said epoxide containing liquid therein;

(c) a hardening accelerating agent comprised of tris(dimethyl amenoethanol) phenol present in said sealing composition in an amount in the range of 0% to about 10% by weight of said epoxide containing liquid;

(d) a light-weight filler comprised of amorphous silica present in said sealing composition in an amount in the range of from about 2.5% to about 30% by weight of said epoxide containing liquid; and (e) hollow glass microspheres present in an amount sufficient to produce a sealing composition density in the range of from about 5 to about 8.5 pounds per gallon.

32. The sealing composition of claim 31 wherein said hollow glass microspheres are present in said sealing composition in an amount in the range of from about 15% to about 45% by weight of said epoxide liquid therein.

33. The sealing composition of claim 31 which further comprises an organosilane bonding agent selected from the group consisting of 3-aminopropyltriethoxysilane and N-2-(aminoethyl)-3 -aminopropyltrimethoxysilane.

34. The sealing composition of claim 33 wherein said organosilane bonding agent is present in said sealing composition in an amount in the range of from about 0% to about 5% by weight of epoxide containing liquid therein.

* * * * *